US012670666B2

(12) United States Patent
Tsiskaridze et al.

(10) Patent No.: US 12,670,666 B2
(45) Date of Patent: Jun. 30, 2026

(54) IMAGE PROCESSING METHOD

(71) Applicant: VITAWARE LTD, Exeter Devon (GB)

(72) Inventors: Archil Tsiskaridze, Exeter Devon (GB); Philippe Georges Young, Exeter Devon (GB)

(73) Assignee: VITAWARE LTD, Exeter Devon (GB)

( * ) Notice: Subject to any disclaimer, the term of this patent is extended or adjusted under 35 U.S.C. 154(b) by 169 days.

(21) Appl. No.: 18/564,211

(22) PCT Filed: May 24, 2022

(86) PCT No.: PCT/EP2022/064118
§ 371 (c)(1),
(2) Date: Nov. 27, 2023

(87) PCT Pub. No.: WO2022/248507
PCT Pub. Date: Dec. 1, 2022

(65) Prior Publication Data
US 2024/0242439 A1     Jul. 18, 2024

(30) Foreign Application Priority Data

May 26, 2021     (GB) ..................................... 2107495

(51) Int. Cl.
*G06T 17/20* (2006.01)
*G06T 7/10* (2017.01)
*G06V 10/764* (2022.01)

(52) U.S. Cl.
CPC ................ *G06T 17/20* (2013.01); *G06T 7/10* (2017.01); *G06V 10/764* (2022.01); *G06T 2207/20084* (2013.01)

(58) Field of Classification Search
CPC ........... G06T 2207/10028; G06T 17/20; G06T 17/205
See application file for complete search history.

(56) References Cited

U.S. PATENT DOCUMENTS

2014/0375636 A1* 12/2014 Young ..................... G06T 19/20
345/420
2018/0137658 A1* 5/2018 Zhang ................... G06T 11/008
(Continued)

FOREIGN PATENT DOCUMENTS

CA     2929892 C   * 12/2018   ......... G06F 16/5854
GB     2515510 A     12/2014
(Continued)

OTHER PUBLICATIONS

International Search Report and Written Opinion for corresponding PCT Application No. PCT/EP2022/064118 dated Sep. 2, 2022 (16 pages).

(Continued)

*Primary Examiner* — Jason Chan
*Assistant Examiner* — Snigdha Sinha
(74) *Attorney, Agent, or Firm* — Leason Ellis LLP

(57)     ABSTRACT

The present invention proposes a technique for selectively recovering features of an original surface (e.g. boundary) representation after the original surface representation has been converted to a digitised image, digitally altered, and a new surface representation generated from the digitally altered digitised image. In particular, this technique involves tracking the portions of the digitised image that are digitally altered and/or not digitally altered, and selectively recovering only the portions of the original surface representation that have not been digitally altered. In this way, the original surface representation can be effectively used as a template to recover accuracy and reintroduce detailed features that would otherwise be lost when converting into image space, but any alterations or manipulations intentionally introduced in the image space are maintained.

20 Claims, 2 Drawing Sheets

(56)          References Cited

U.S. PATENT DOCUMENTS

| | | | | |
|---|---|---|---|---|
| 2019/0311546 A1 * | 10/2019 | Tay | .......................... | G06T 7/521 |
| 2020/0405455 A1 * | 12/2020 | Nikolskiy | .............. | A61B 6/466 |
| 2021/0241885 A1 * | 8/2021 | Ouyang | ................ | G16H 50/20 |
| 2021/0358210 A1 * | 11/2021 | Yu | ........................... | G06T 17/10 |
| 2022/0277457 A1 * | 9/2022 | Weese | ....................... | G06T 3/60 |

FOREIGN PATENT DOCUMENTS

| | | | | | |
|---|---|---|---|---|---|
| GB | 2576434 | A | 2/2020 | | |
| WO | 2017153259 | A1 | 9/2017 | | |
| WO | WO-2020141950 | A1 * | 7/2020 | ............ | G06T 9/001 |

OTHER PUBLICATIONS

GB Search Report for corresponding GB Application No. 2107495.0 dated Feb. 21, 2022 (3 pages).

* cited by examiner

IMAGE PROCESSING METHOD

CROSS-REFERENCE TO RELATED APPLICATIONS

This application is a U.S. National Stage Application under 35 U.S.C. § 371 of International Patent Application No. PCT/EP2022/064118, filed May 24, 2022, which claims priority to Great Britain Patent Application No. 2107495.0 filed May 26, 2021, the contents of which are each hereby incorporated by reference in their respective entireties.

FIELD OF THE INVENTION

The present invention relates to a method for manipulating a representation of a virtual three-dimensional object. In particular, the invention may provide a robust scheme for transforming between a point cloud or boundary representation and a digitised three-dimensional image representation of the object. The virtual three-dimensional object may be obtained from a real object, such as a dental impression. The manipulation methods set out herein may be used to simulate the effects of orthodontic procedures on tooth-gum or inter-tooth boundaries.

BACKGROUND

Three-dimensional (3D) scanning is a process used to obtain a three-dimensional model of an object. The three-dimensional model is typically obtained using a 3D scanner uses a probe to obtain information about the surface of the object. 3D scanners may use either contact probes that physically touch the surface or non-contact probes which use a beam of radiation to obtain information about the surface using range finding or triangulation techniques.

The output from a 3D scanner is typically a point cloud in a notional three-dimensional coordinate system, where each point consists of a measurement result obtained by the probe. The point cloud represents the scanned surface of the object.

The point cloud may be converted to a 3D surface representation through any of a variety of surface reconstruction techniques. For example, the point cloud data may be converted into tessellated triangles that represent a surface. In some examples, a 3D surface representation may be expressed as a boundary representation of a three-dimensional geometry (e.g. where a three-dimensional object is represented as a collection of connected surface elements showing the boundary between the object and the surrounding space), where the boundary representation makes use of NURBS, polygons, or other surface representations.

The point cloud data (or a surface representation obtained from it) may be manipulated in various ways, e.g. filtering, smoothing, segmenting. The point cloud may be used as the basis for principal component analysis. In some cases, suitably labelled point cloud data may be used as the basis for training a machine learning algorithm such as a neural network.

One field in which the above techniques find practical application is 3D dental imaging, where a 3D model of a patient's dental structure can be used to simulate a treatment plan in advance. In this example, the ability to segment a point cloud, e.g. to identify different regions in the object (such as different teeth and gums) is particularly useful.

SUMMARY OF THE INVENTION

At its most general, the present invention proposes a technique for selectively recovering features of an original surface (e.g. boundary) representation after the original surface representation has been converted to a digitised image, digitally altered, and a new surface representation generated from the digitally altered digitised image. In particular, this technique involves tracking the portions of the digitised image that are digitally altered and/or not digitally altered, and selectively recovering only the portions of the original surface representation that have not been digitally altered. In this way, the original surface representation can be effectively used as a template to recover accuracy and reintroduce detailed features that would otherwise be lost when converting into image space, but any alterations or manipulations intentionally introduced in the image space are maintained.

The invention may find particular use in scenarios where the original surface representation is obtained from point cloud data, which in turn may be obtained by scanning a physical object.

The present inventors have conceived the invention from an understanding that certain operations on point cloud data are better effected if the point cloud data is transformed into image/volume space by digitization. These operations may be include 3D manipulations, e.g. simulating the effect of relative movement of features within a virtual 3D object, or the training or application of machine learning technique, e.g. to classify features of the virtual 3D object. However, the challenge of this approach is to avoid introducing unwanted errors or variations in the point cloud data in the transformation between a point cloud or surface representation and a digitised image/volumetric representation. The present invention provides a solution to this challenge.

According to a first aspect, there is provided a method of manipulating a virtual representation of a three-dimensional object, the method comprising: obtaining a master surface representation of the object; sampling a bounding volume containing the master surface representation to generate a digitised three-dimensional representation of the object, wherein the digitised three-dimensional representation of the object comprises a voxelized model of the object; modifying the digitised three-dimensional representation; generating a slave surface representation of the object from the modified digitised three-dimensional representation; and adapting the slave surface representation by: identifying one or more points in the slave surface representation that are associated with unchanged voxels in the modified digitised three-dimensional representation; and transferring each of the identified one or more points in the slave surface representation to a respective location on the master surface representation.

The aim of the adapting step may be to bring the geometry of any portions of the slave surface representation that have not been intentionally modified in the image space closer to that of the master surface representation. In this way, any portions of the slave surface representation that have not been intentionally digitally altered in the image space may more accurately resemble the master surface representation and/or may reintroduce one or more features of the master surface representation that have been unintentionally lost during conversion into the image space. Furthermore, as only points in the slave surface representation associated with the unmodified voxels are moved, any portions of the slave surface representation that have been intentionally modified in the image space are maintained.

The method may include generating a reference slave surface representation from the unmodified digitised three-dimensional representation; and comparing the slave surface representation with the reference slave surface representation to identify the one or more points in the slave surface representation that are associated with unchanged voxels. The reference slave surface representation may be generated in the same manner (and at the same level of detail/resolution) as the slave surface representation. This means they are directly comparable, in the sense that unmodified regions of the digitised three-dimensional representation should yield a substantially identical set of points (nodes of a mesh). Unmodified points in the slave surface representation can therefore be efficiently identified as those that have corresponding points (e.g. within a certain threshold distance from an equivalent location) in the reference slave surface representation.

The method may include flagging points in the slave surface representation that do not have a corresponding point in the reference slave surface representation; and maintaining the location of the flagged points in the slave surface representation. In this way, the geometry of any portions of the slave surface representation that were intentionally modified in the image space, are not brought closer to that of the master surface representation. Accordingly, any modifications or alterations to the geometry intentionally introduced in the image space are maintained in the slave surface representation.

Alternatively or additionally, the method may comprise tracking changes to voxels in the digitised three-dimensional representation as it is modified; flagging points in the slave surface representation that are spawned from the tracked changed voxels; and maintaining the location of the flagged points in the slave surface representation associated with the changed voxels in the modified digitised three-dimensional representation. In other words, the one or more points in the slave surface representation associated with the changed voxels in the modified three-dimensional representation are not transferred to a respective location on the master surface representation.

In practice, the process of generating the slave surface representation means that the master surface representation and the slave surface representation share a common frame of reference. If this is not the case, the comparing step may include co-registering the master surface representation and the slave surface representation.

As used herein, the term "surface representation" may mean a boundary representation expressed in any suitable format, e.g. data representative of a surface in three dimensions, e.g. a mesh of node points connected by contiguous polygons, a point cloud, a volume mesh, or be defined using a Non-uniform rational basis spline (NURBS) mathematical model.

For example, the master surface representation may comprise a mesh of node points connected by contiguous polygons, such as triangles. The plurality of points in the master surface representation may therefore correspond to the node points of the mesh.

Similarly, the slave surface representation may comprise a mesh of node points connected by contiguous polygons, such as triangles. The points in the slave surface representation may therefore correspond to the node points of the mesh.

The step of transferring the one or more points in the slave surface representation associated with the unmodified voxels to a respective location on the master surface representation may comprise moving each of these points on to the surface of the master surface representation that is closest to it in a direction normal to the surface of the master surface representation. Alternatively, each of these points may be moved on to the surface of the master surface representation that is closest to it in a direction normal to the surface of the slave surface representation. In further alternative embodiments, this step may further comprise spawning a new point on the slave surface representation, and moving the new point. To recover detail from the master surface representation, the method may further comprise generating a plurality of new points in the slave surface representation to increase the point density in regions corresponding to the identified points in the slave surface representation that are associated with unchanged voxels.

The master surface representation may be obtained by scanning a physical three-dimensional object to obtain point cloud data, and converting the point cloud data into the master surface representation. In some example, the point cloud data may be obtained from a dental impression. As used herein, a dental impression may be a negative imprint of hard (e.g. teeth) and soft (e.g. gums) matter in a mouth from which a positive reproduction (e.g. a cast or a model) can be formed. As such, the virtual three-dimensional object may be a positive reproduction of teeth and gums obtained from the dental impression. The dental impression may itself be obtained by intra-oral scan or by a physical impression made by placing a liquid or semi-solid impression material in a dental impression tray, placing the dental impression tray into a mouth, wherein the impression material sets to become an elastic solid, leaving an imprint of the teeth and gums.

Optionally, the method may further comprise segmenting the master surface representation by classifying each of the plurality of points (e.g. points in a point cloud, or node points between the polygons) as hard matter (e.g. tooth) or soft matter (e.g. gum).

The step of modifying the digitised three-dimensional representation may comprise changing one or more voxel values. In one example, the voxel value may be changed by using a "paint" operation that represents a change in shape of the digitised three-dimensional representation. Alternatively or additionally, the voxel value may be changed by applying a label, e.g. by classifying the voxels in the digitised three-dimensional representation. The step of modifying may include introducing a new sub-structure to the digitised three-dimensional representation. The new sub-structure may be added manually, e.g. as a painting process to change voxel values, or may be added in a semi-automated manner, e.g. by using inference techniques to predict the location of a feature.

The method may thus comprise segmenting the digitised three-dimensional representation by classifying each of the voxels. Where the object is a dental impression, the voxels may be classified as tooth or gum, for example. The digitised three-dimensional representation may be segmented using information obtained by segmenting the master surface representation. The step of segmenting the digitised three-dimensional representation may be performed using convolutional neural networks (CNNs), or by any other conventional approach.

In this way, a user is able to establish which voxels correspond to teeth, and which voxels correspond to gum. This information (e.g. the segmented digitised three-dimensional representation) can be used to inform further modifications, e.g. digital alteration of one or more regions of the digitised three-dimensional representation. For example, the information about which voxels correspond to teeth and which voxels correspond to gum may be used to modify the digitised three-dimensional representation such that when the slave surface representation is generated from the modified three-dimensional representation, the modifications illustrate (e.g. visualise) the result or effect on the teeth/gums from certain orthodontic procedures. As an example, the modifying step may include processes for separating adjacent teeth, smoothing interdental faces, or adding root or other tissue structures, when the digitised three-dimensional representation is converted to the slave surface representation.

The conversion into image data, i.e. the step of sampling a bounding volume, may be performed using any standard technique. For example, the sampling step may include a binary voxelisation step, wherein voxels in the image data (e.g. the digitised three-dimensional representation) are marked as either inside or outside the master surface representation.

Alternatively or additionally, the sampling step may include assigning values to the voxels based on a signed distance function, where voxels near the surface of the master surface representation are assigned values which reflect their distance to that surface. Voxels inside the master surface representation may be given negative values, whereas those outside may be given positive values.

Alternatively or additionally, the sampling step may include assigning values to the voxels based on an unsigned distance function, wherein voxels near the surface of the master surface representation reflect their distance to that surface without any distinction between what is inside and what is outside. Thus, the voxels that are far away are given low values.

Alternatively or additionally, the sampling step may include assigning values to the voxels based on the percentage of the voxel that is inside or outside the master surface representation, using a partial volume function.

In this way, the digitised three-dimensional representation of the object is effectively an approximate bitmapped representation of the master surface representation, wherein the degree of approximation can be controlled by selecting the sampling rate.

Optionally, the step of modifying the digitised three-dimensional representation may comprise manipulating the image data using known image processing techniques, such as paint/unpaint, open/close, filtering, smoothing, flood filling, and/or performing a morphological operation.

As such, the step of modifying the digitised three-dimensional representation may comprise painting the region to add or remove voxels in the digitised three-dimensional representation.

The step of modifying the digitised three-dimensional representation may comprise smoothing the digitised three-dimensional representation or performing Boolean operations in order to de-feature (i.e. simplify) a geometry or create different modified components (e.g. modified tooth/gum boundaries and/or inter-tooth boundaries).

In particular the step of modifying the digitised three-dimensional representation may be performed to modify boundaries between teeth and gum, and/or adjacent teeth, in the segmented digitised three-dimensional representation. For example, boundaries between teeth and gum, and/or adjacent teeth, may be modified in the image space to show the effects of certain orthodontic procedures when the representation is converted into the slave surface representation.

Optionally, the method may comprise generating and storing a register of voxels in the digitised three-dimensional representation. The step of identifying one or more points in the slave surface representation associated with the unmodified voxels in the modified digitised three-dimensional representation can be performed using the register. For example, the step of identifying the voxels in the digitised three-dimensional representation which are changed and/or unchanged may comprise generating a log that tracks changes to each voxel in the digitised three-dimensional representation. Similarly, any points in the slave surface that are associated with modified voxels can be identified using the register. As mentioned above, the position of these points is not adjusted.

The method may comprise tracking only the voxels which are modified, tracking only the voxels that are unmodified, or both. Where the modified voxels are tracked, the step of tracking the voxels which are modified may comprise flagging modified voxels in the modified three-dimensional representation. Additionally/alternatively, where the unmodified voxels are tracked the step of tracking the voxels which are unmodified may comprise flagging unmodified voxels in the modified three-dimensional representation.

The step of identifying the one or more points in the slave surface representation associated with the unmodified voxels may therefore be based on the flagged modified or unmodified voxels in the modified three-dimensional representation, and the association of the plurality of points in the master surface representation with the corresponding voxels in the digitised three-dimensional representation (e.g. the register). In particular, this step may further comprise flagging one or more points in the slave surface representation associated with the flagged modified (or alternatively unmodified) voxels to distinguish the points in the slave surface representation that have been intentionally modified (or unmodified). Based on these flags in the slave surface representation, one or more points in the slave surface representation associated with unmodified voxels may therefore be identified.

The step of generating a slave surface representation from the modified digitised three-dimensional representation may use any conventional surface reconstruction technique, e.g. an isosurfacing technique such as the marching cubes algorithm. In particular, where the object comprises a plurality of component parts (e.g. teeth and gum) which are intended to conform with one another, generating the slave surface representation may comprise using the multi-part marching cube algorithm to ensure conformity at all part interfaces.

Alternatively, the step of generating the slave surface representation may comprise generating a volume mesh of the modified digitised three-dimensional representation e.g. using any known technique such as advancing front or Delaunay meshing.

The method may be for preparing a virtual three-dimensional object to be suitable for three-dimensional printing, or for further Computer Aided Engineering (CAE) analysis techniques, such as Finite Element Analysis (FEA) and Computational Fluid Dynamics (CFD).

The method may include outputting the modified slave surface representation, e.g. for display or further processing. For example, the modified slave surface representation may be transmitted to a three-dimensional printer or CNC machine. The modified slave surface representation may also be suitable for further operations in CAD space (e.g. polygonal, surface representation space), e.g. in generating volume meshes, and/or converting to higher order NURBS surfaces, etc.

According to a second aspect, there is provided a computer program product comprising a computer-readable storage medium having software instructions stored thereon, the software instructions being executable by a computer to perform the method of the first aspect.

The invention includes the combination of the aspects and preferred features described except where such a combination is clearly impermissible or expressly avoided.

SUMMARY OF THE FIGURES

Embodiments and experiments illustrating the principles of the invention will now be discussed with reference to the accompanying figures in which.

DETAILED DESCRIPTION OF THE INVENTION

Aspects and embodiments of the present invention will now be discussed with reference to the accompanying figures. Further aspects and embodiments will be apparent to those skilled in the art. All documents mentioned in this text are incorporated herein by reference.

Figure 1:
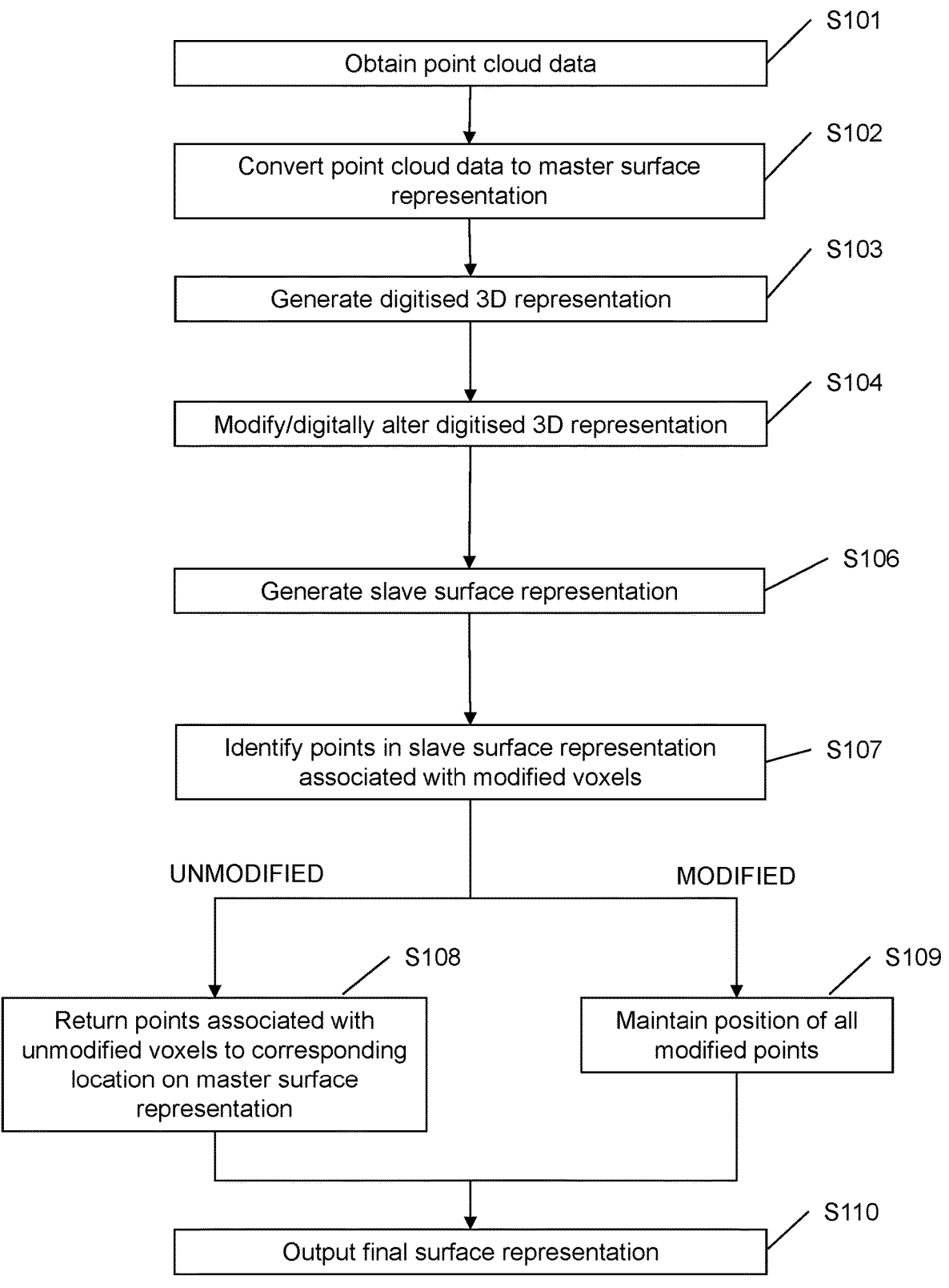
FIG. 1 shows a flow chart illustrating a method for modifying a surface representation obtained from point cloud data that is an embodiment of the invention.

FIG. 1 shows a method of modifying a surface representation of an object that is an embodiment of the invention. The invention may be used with any type of object, but can be especially advantageous where the object is a dental impression. In this embodiment, an original surface representation of the object is used as a template to recover accuracy and reintroduce detailed features that would otherwise be lost when converting into image space, but where any manipulations or alterations intentionally introduced in the image space are maintained. In particular, the method involves tracking manipulations in image/volume space, and selectively recovering only the portions of the original surface representation that were not manipulated.

The method begins with a step S101 of obtaining point cloud data for the object. This may be done by scanning the object using any conventional approach.

At S102, the point cloud data is converted into a master surface representation (e.g. a boundary representation) of the object, e.g. of the teeth and gums of an individual where the object is a dental impression. The dental impression may be obtained by intra-oral scan, or from a physical impression. The master surface representation may be obtained from the point cloud data using any conventional meshing technique.

At S103, a digitised three-dimensional representation of the object is generated. Specifically, a bounding volume containing the master surface representation is sampled to generate the digitised three-dimensional representation, in image/volume space. This step may be performed using any standard technique, such as binary voxelisation, using a signed/unsigned distance function, or using a partial volume function. This creates an approximate "bitmapped" three-dimensional representation of the object. The degree of approximation can be controlled by selecting the sampling rate.

Step S103 may further include generating or updating a register of voxels in the digitised three-dimensional representation. This register may be used to identify the parts of the master surface representation that are affected or unaffected by modifications to the digitised three-dimensional representation.

Next, at S104, one or more portions of the digitised three-dimensional representation are digitally altered. Where the object is a dental impression, this step may correspond to a desired orthodontic procedure, for example to move, reposition or manipulate the teeth with respect to one another. The three-dimensional representation facilitates an ability to identify a particular sub-volume as corresponding to a particular tooth. For example, as discussed in more detail below, the digitised three-dimensional representation may be segmented to identify volumes corresponding to different tissue structures. Each tooth sub-volume may thus be manipulated independently within the frame of reference of the three-dimensional representation, while retaining its shape. This step can be performed manually, and may include processing for separating adjacent teeth, and smoothing interdental spaces, for example. A segmentation of the digitised three-dimensional representation may be used during this step to guide how the digitised three-dimensional representation is digitally altered. Digitally altering may include manipulating the image data using known imaging processing techniques, such as paint/un-paint, open/close, filtering, smoothing, flood filling and/or performing a morphological operation. The digital alteration may include introducing a new feature to the digitised three-dimensional representation.

At S106, a slave surface representation of the teeth and gums is generated from the digitally-altered digitised three-dimensional representation. The slave surface representation is preferably in the same form as the master surface representation. The slave surface representation may be obtained using any suitable surface reconstruction technique, such as multi-part marching cubes algorithm or the like.

Next, at S107, the points (e.g. vertices or nodes in a mesh) of the slave surface representation corresponding to the modified voxels in the digitally altered digitised three-dimensional representation are identified and flagged. Alternatively, or additionally, the points of the slave surface representation corresponding to unmodified voxels may be identified and flagged.

The slave surface representation at this stage of the method may be similar to the master surface representation. Any differences between the master surface representation and the slave surface representation will be due to either i) intentional modifications introduced in the image space at S104, or ii) unintentional modifications introduced by the conversion into image space, which is typically a lossy transformation. In the present method, these types of modification are distinguished. The slave surface representation may use a flag to identify and indicate which points (e.g. points in the point cloud/node points between the triangles of the mesh) have been intentionally modified (referred to a "modified point" below) and/or intentionally unmodified (reference to as "unmodified points") as a result of changes made in the image space.

The modified or unmodified points slave surface representation may be identified in a number of ways.

In one example, modified points of identified by using the register of voxels to identify which voxels in the digitised three-dimensional representation that are changed in the modifying step. When the slave surface representation is generated, each point therein is obtained by interpolating between voxels in the digitally-altered digitised three-dimensional representation. Using knowledge of which voxels have been changed, it is possible to label the points spawned using those changed voxels as modified points. Points spawned from unchanged voxels may be labelled as unmodified (or the absence of a label or flag may be used to indicate that they are unmodified).

In another example, the modified points may be identified by a direct comparison of (i) the slave surface representation obtained from the digitally altered digitised three-dimensional representation with (ii) a reference slave surface representation obtained from the original digitised three-dimensional representation. The generation of the reference slave surface is in some ways counterintuitive, since the conversion of the master surface representation to the original digitised three-dimensional representation is typically a lossy process and hence the reference slave surface is likely to have lost some of the detail available on the master surface representation. However, in the present method, the reference slave surface representation actually provides an efficient means of identifying modified/unmodified points, because it (unlike the master surface representation) is directly comparable with the slave surface representation obtained from the digitally altered digitised three-dimensional representation. In practice, the method may include identifying unmodified points in the slave surface representation as those that have a matching point in a corresponding position (within a certain threshold) in the reference slave surface representation.

In the method, the modified and unmodified points are handled differently. For unmodified points, the method continues with step S108, where the points in the slave surface representation that correspond to voxels that were not intentionally modified are moved to a respective location on the master surface representation. In other words, the geometry of any portions of the slave surface representation that were not intentionally modified are brought closer to that of the master surface representation. This may help to reintroduce features that were unintentionally lost during the lossy conversion into image space.

Each of these points may be moved on to the surface of the master surface representation that is closest to it in a direction normal to the surface of the master surface representation. Alternatively, each of these points may be moved on to the surface of the master surface representation that is closest to it in a direction normal to the surface of the slave surface representation. In a further alternative embodiments, this step may further comprise spawning a new point on the slave surface representation, and moving the new point. Indeed, in order to recover detailed features from the master surface representation, this step may include spawning a plurality of new points in the region of each unmodified point, and moving each new point on to the surface of the master surface representation. The density of new points may be selected to corresponding to the resolution of the master surface representation to permit the original detail to be recovered.

For modified points, the method continues with step S109, in which all points in the slave surface representation that correspond to voxels that were intentionally modified are retained in their position in the slave surface representation. In this way, the geometry of any portions of the slave surface representation that were intentionally digitally altered in the image space, are not brought closer to that of the master surface representation. Accordingly, any intentional alterations introduced in the image space are not removed from the slave surface representation. The effect of steps S108 and S109 is to blend the slave surface representation with the master surface representation to retain the detail of original (unaltered) features while accurately representing the effect of any intentional modification.

The resolution of the features on the slave surface representation corresponding to modified voxels is limited to the resolution of the digitally altered digitised three-dimensional representation. However, the mesh in these modified regions may also be subdivided to generate new points, e.g. to applying smoothing effects in a conventional manner, especially where elements (e.g. triangles) in the mesh comprise a mix of modified and unmodified points.

The method may include a step S110 of outputting a final surface representation, which corresponds to the blended surface representation mentioned above. The final surface representation may be output in any suitable form, e.g. as an STL file or the like.

Where the object is a dental impression, the method can be used to visualise effects of orthodontic procedures on the teeth and gums of the individual, whilst still maintaining the detail of the original surface representation which may otherwise be lost during conversion into image space.

Figure 2:
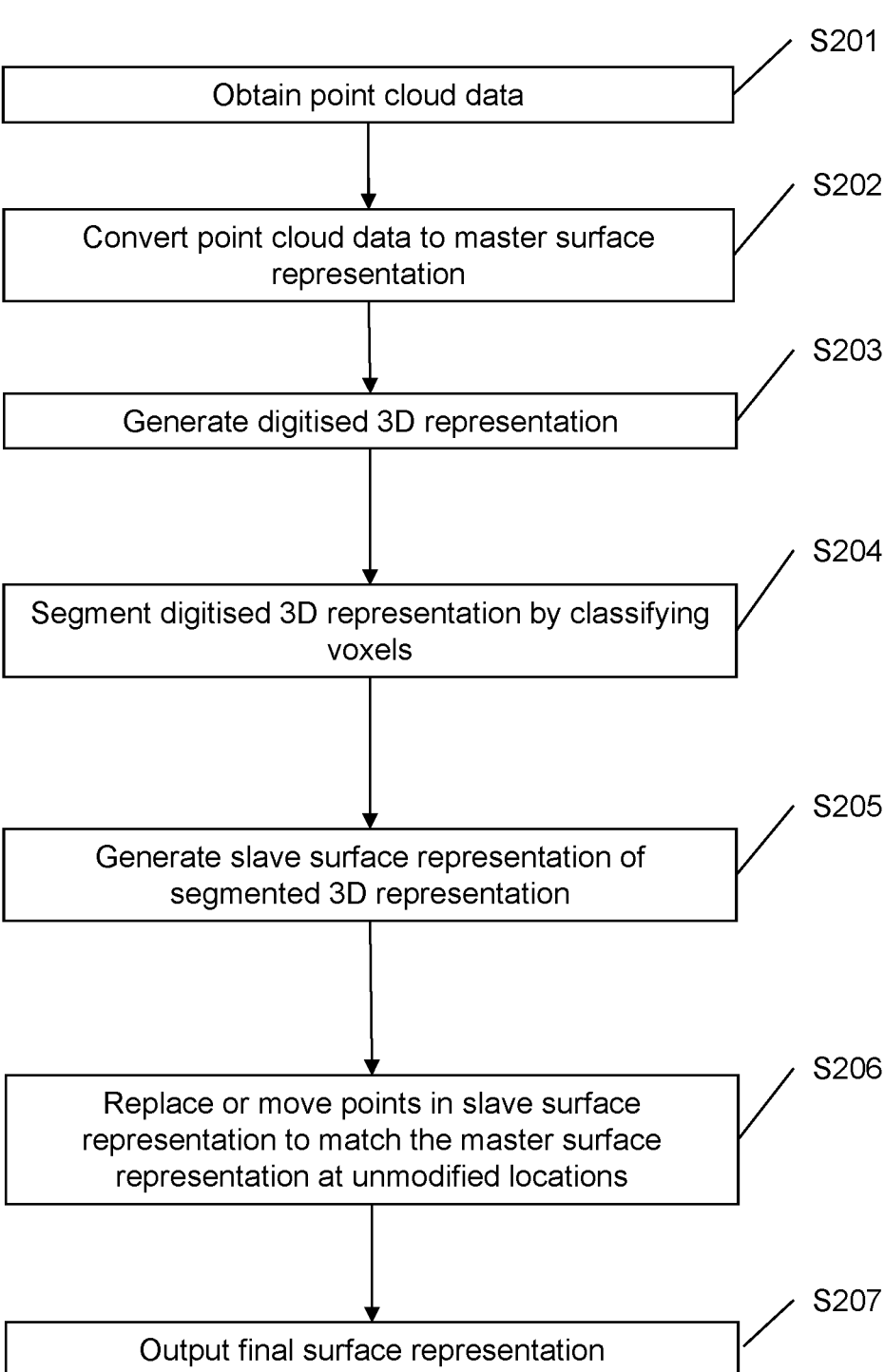
FIG. 2 shows a flow chart illustrating a method for modifying a surface representation obtained from point cloud data that is another embodiment of the invention.

FIG. 2 shows another method of modifying a surface representation of an object that is an embodiment of the invention. In this example, the modification involves segmenting the surface representation, i.e. introducing new boundaries to demarcate certain sub-sections of the object. Again, this technique may be particularly advantageous where the object is a dental impression, as the segmentation can be used to separate the object into different tissue types, e.g. to distinguish teeth from gums.

In this embodiment, a classification algorithm may operate on a digitised three-dimensional representation of the object in image/volume space to identify the different subsections thereof. A new surface representation including boundaries between newly-defined segments may be constructed from the segmented digitised three-dimensional representation. In this embodiment, the original surface representation of the object is used recover detailed features that would otherwise be lost when converting into image space, but the new boundaries intentionally introduced by the segmentation process are maintained.

It may be understood that the segmentation process discussed in relation to this embodiment may be combined with a step of digitally modifying or otherwise altering voxels as discussed above (see step S104). That is, embodiments of the invention may include both segmentation and digital manipulation of a digitised three-dimensional representation in image/volume space.

Turning to FIG. 2, the method of this embodiment begins with a step S201 of obtaining point cloud data for the object. This may be done by scanning the object using any conventional approach.

At S202, the point cloud data is converted into a master surface representation (e.g. a boundary representation) of the object, e.g. of the teeth and gums of an individual where the object is a dental impression. The dental impression may be obtained by intra-oral scan, or from a physical impression. The master surface representation may be obtained from the point cloud data using any conventional meshing technique.

At S203, a digitised three-dimensional representation of the object is generated. Specifically, a bounding volume containing the master surface representation is sampled to generate the digitised three-dimensional representation, in image/volume space. This step may be performed using any standard technique, such as binary voxelisation, using a signed/unsigned distance function, or using a partial volume function. This creates an approximate "bitmapped" three-dimensional representation of the object. The degree of approximation can be controlled by selecting the sampling rate.

Similarly to step S103 above, step S203 may further include generating or updating a voxel register. In this embodiment, this register can be used to track which voxels are associated with the original surface.

Next, at S204, the digitised three-dimensional representation is segmented into separate sub-volumes (e.g. corresponding to teeth and gums). In particular, each voxel of the digitised three-dimensional representation is classified as a particular tooth or gum. In this way, separate teeth, and the tooth/gum line can be distinguished in the digitised three-dimensional representation. This step may be carried out manually, or using a conventional machine learning tool, such as a convolutional neural networks (CNNs).

At S205, a slave surface representation of the teeth and gums is generated from the segmented digitally-altered digitised three-dimensional representation. The slave surface representation is preferably in the same form as the master surface representation. The slave surface representation may be obtained using any suitable surface reconstruction technique, such as multi-part marching cubes algorithm or the like. Unlike the master surface representation, however, the slave surface representation will include new boundaries between the segmented sub-volumes of the digitised three-dimensional representation. Some of the new boundaries will be internal, i.e. lie wholly inside the surface defined by the master surface representation. Other new boundaries may lie on or intersect with the surface defined by the master surface representation.

Step S205 may include updating the register established in step S203 to flag voxels that are associated with boundaries in the slave surface representation. The register may then be used to identify a first class of voxels that are associated with boundaries in both the master and slave surface representation and a second class of voxels that are associated only with boundaries in the slave surface representation.

At S206, the points (e.g. nodes in a mesh) of the slave surface representation corresponding to (i.e. spawned using) voxels in the first class are moved to a respective location on the master surface representation. In other words, the geometry of any portions of the slave surface representation that correspond to the master surface representation are brought closer to that of the master surface representation. This may help to reintroduce features that were unintentionally lost during the lossy conversion into image space. As mentioned above, one or more new points may be spawned in this process to increase a mesh density and thereby recover original detail.

Each of these points may be moved on to the surface of the master surface representation that is closest to it in a direction normal to the surface of the master surface representation. Alternatively, each of these points may be moved on to the surface of the master surface representation that is closest to it in a direction normal to the surface of the slave surface representation.

Meanwhile, the points (e.g. nodes in a mesh) of the slave surface representation corresponding to (i.e. spawned using) voxels in the second class are retained. The effect of this step S206 is to blend the newly formed boundaries in the slave surface representation with the original detail of the master surface representation.

As an alternative to using the voxel register to identify the new boundaries, the method may comprise comparing the slave surface representation with a reference slave surface representation obtained from the original digitised three-dimensional representation as explained above to identify the newly introduced points.

In one example, step S206 may be performed by blending the points corresponding to voxels in the second class into the master surface representation. In this example, the points of the slave surface representation corresponding to voxels in the first class are replaced wholesale by the points of the master surface representation.

The method may include a step S207 of outputting a final surface representation, which corresponds to the blended surface representation mentioned above. The final surface representation may be output in any suitable form, e.g. as an STL file or the like.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

The invention claimed is:

1. A method of manipulating a virtual representation of a three-dimensional object, the method comprising:

obtaining a master surface representation of the object;

sampling a bounding volume containing the master surface representation to generate a digitised three-dimensional representation of the object, wherein the digitised three-dimensional representation of the object comprises a voxelized model of the object;

modifying the digitised three-dimensional representation;

generating a slave surface representation of the object from the modified digitised three-dimensional representation; and adapting the slave surface representation by:

generating a reference slave surface representation from the unmodified digitised three-dimensional representation;

comparing the slave surface representation with the reference slave surface representation to identify one or more points in the slave surface representation that are associated with unchanged voxels in the modified digitised three-dimensional representation; and transferring each of the identified one or more points in the slave surface representation to a respective location on the master surface representation.

2. The method of claim 1, further comprising:

flagging points in the slave surface representation that do not have a corresponding point in the reference slave surface representation; and maintaining the location of the flagged points in the slave surface representation.

3. A method of manipulating a virtual representation of a three-dimensional object, the method comprising:

obtaining a master surface representation of the object;

sampling a bounding volume containing the master surface representation to generate a digitised three-dimensional representation of the object, wherein the digitised three-dimensional representation of the object comprises a voxelized model of the object;

modifying the digitised three-dimensional representation;

tracking voxels that are unmodified in the digitised three-dimensional representation as it is modified;

generating a slave surface representation of the object from the modified digitised three-dimensional representation; and adapting the slave surface representation by:

flagging points in the slave surface representation that are associated with the tracked unmodified voxels; and transferring each of the flagged points in the slave surface representation to a respective location on the master surface representation.

4. The method of claim 3, wherein tracking voxels that are unmodified in the digitised three-dimensional representation comprises comparing the digitised three-dimensional representation before and after modification.

5. The method of claim 3, wherein tracking voxels that are unmodified in the digitised three-dimensional representation comprises generating a log that tracks changes to each voxel in the digitised three-dimensional representation.

6. The method of claim 1, wherein transferring each of the identified one or more points in the slave surface representation comprises replacing the identified one or more points with corresponding points of the master surface representation.

7. The method of claim 1, wherein transferring each of the identified one or more points in the slave surface representation comprises moving the identified one or more points to a new location on the master surface representation.

8. The method of claim 1, further comprising generating a plurality of new points in the slave surface representation to increase the point density in regions corresponding to the identified points in the slave surface representation that are associated with unchanged voxels.

9. The method of claim 1, wherein obtaining the master surface representation comprises:

scanning a physical three-dimensional object to obtain point cloud data; and converting the point cloud data into the master surface representation.

10. The method of claim 1, wherein the master surface representation comprises a mesh of node points connected by contiguous polygons.

11. The method of claim 1, wherein the slave surface representation comprises a mesh of node points connected by contiguous polygons, and the points in the slave surface representation correspond to the node points of the mesh.

12. The method of claim 1, wherein the step of generating a slave surface representation from the modified three-dimensional representation is performed using the multi-part marching cube algorithm.

13. The method of claim 1, wherein the step of generating a slave surface representation from the modified three-dimensional representation comprises generating a volume mesh of the modified digitised three-dimensional representation.

14. The method of claim 1, wherein modifying the digitised three-dimensional representation comprises changing one or more voxel values.

15. The method of claim 1, wherein modifying the digitised three-dimensional representation comprises segmenting the digitised three-dimensional representation by classifying each of the voxels.

16. The method of claim 15, wherein classifying each voxel is performed using a convolutional neural network.

17. The method of claim 1, wherein modifying the digitised three-dimensional representation comprises introducing a new sub-structure into the digitised three-dimensional representation.

18. The method of claim 1, wherein the object is a dental impression.

19. A computer program product comprising a non-transitory computer-readable storage medium having software instructions stored thereon, the software instructions being executable by a computer to perform the method of claim 1.

20. A computer program product comprising a non-transitory computer-readable storage medium having software instructions stored thereon, the software instructions being executable by a computer to perform the method of claim 3.

* * * * *